United States Patent [19]

Nakamura et al.

[11] 4,096,692
[45] Jun. 27, 1978

[54] AIR-PUMP SYSTEM FOR RECIPROCATING ENGINES

[75] Inventors: Hirokazu Nakamura; Tsuneo Ohinouye, both of Kyoto; Kenji Hori, Nagaokakyo; Tatsuro Nakagami, Kyoto; Yutaka Tsukamoto, Jyoyo; Katsuo Akishino, Kameoka, all of Japan

[73] Assignee: Mitsubishi Jidosha Kogyo Kabushiki Kaisha, Japan

[21] Appl. No.: 718,329

[22] Filed: Aug. 27, 1976

[30] Foreign Application Priority Data

Apr. 15, 1976 Japan ............................ 51-47391[U]
May 28, 1976 Japan ............................ 51-69427[U]

[51] Int. Cl.² .......................................... F01N 3/10
[52] U.S. Cl. ............................ 60/307; 123/75 CC; 417/364; 417/380
[58] Field of Search ............. 60/307; 417/364, 380; 123/75 CC, 75 RC, DIG. 5

[56] References Cited

U.S. PATENT DOCUMENTS

| | | | |
|---|---|---|---|
| 851,334 | 4/1907 | Altham | 123/DIG. 5 |
| 1,328,265 | 1/1920 | Caunt | 123/75 CC |
| 1,396,045 | 11/1921 | Mellen | 123/75 CC |
| 1,476,255 | 12/1923 | Kashiwabara | 123/75 CC |
| 3,263,701 | 8/1966 | Johnson | 417/380 |
| 3,613,646 | 10/1971 | Hisada | 123/75 CC |
| 3,672,172 | 6/1972 | Hammond | 60/307 |
| 3,877,222 | 4/1975 | Scherenberg | 60/307 |
| 3,906,908 | 9/1975 | Franke | 60/305 |

*Primary Examiner*—Robert E. Garrett
*Attorney, Agent, or Firm*—Robert E. Burns; Emmanuel J. Lobato; Bruce L. Adams

[57] ABSTRACT

A crank chamber in a multicylinder-engine is divided by division walls into a plurality of spaces each of which contains one set of cranks fixed to a crankshaft, and in which varying air pressure is developed. The air under such pressure flows into a pressure chamber of an air-pump, as power source to drive the pump; suitably compressed air is produced in a pump chest of this air-pump. This air can be supplied to an exhaust gas passage for recombustion of incompletely oxidized combustive gas in the exhaust gas.

5 Claims, 18 Drawing Figures

AIR-PUMP SYSTEM FOR RECIPROCATING ENGINES

BACKGROUND OF THE INVENTION

This invention relates to an air-pump system to be used with reciprocating engines for automobiles etc. Automotive engines, for instance, sometimes carry air-pumps as their auxiliaries. Particularly, purification of exhaust gases with secondary or other fresh air has become an important measure to successfully comply with exhaust emission legislations that have been growing increasingly stringent. So many engines today are equipped with air-pumps.

Conventionally, displacement pumps of the vane-type etc., which are mechanically driven through the crankshaft of the engine, have been in popular use. But such displacement pumps are costly and vulnerable to great power loss. Further, this type of pump discharges more and more air as engine speed increases, as indicated by a dot-dash-line A or B in FIG. 1. Therefore, they have required provision of air-supply control means when used in the exhaust system as a device to supply air in order to promote oxidation of exhaust emissions.

There have also been proposed means to supply air to the exhaust system by utilizing pulsation of the exhaust gas so that a reed valve be opened by the differential pressure developed between the exhaust pressure and the atmospheric pressure when the former becomes negative. This device, however, supplies less air than the aforesaid one, as indicated by a broken line C in FIG. 1. Further, its limited air supply abruptly drops with an increase in engine speed. Consequently, air shortage is liable to arise particularly in the region where the engine is operated at medium or high speed.

SUMMARY OF THE INVENTION

The object of this invention is to provide an air-pump system that eliminates the aforesaid problems. The air-pump system according to this invention comprises a partition plate to separate a crank chamber, containing a set of cranks fixed to a crankshaft, from other crank chambers and an oil pan, which is provided between the lower ends of the adjacent two of a plurality of parallel division walls formed in the lower portion of a multi-cylinder-engine cylinder block to provide bearings to support the crankshaft, wherein an air-pump responsive to differential pressure is operated by varying air pressure developed in one or more crank chambers thus separated. This air-pump system is inexpensive, reduces power loss, and supplies to the exhaust system a suitable quantity of secondary air for oxidation of exhaust emissions.

BRIEF DESCRIPTION OF THE DRAWINGS

Now an embodiment of this invention will be described in detail by reference to the accompanying drawings, in which.

DESCRIPTION OF PREFERRED EMBODIMENTS

Figure 2:
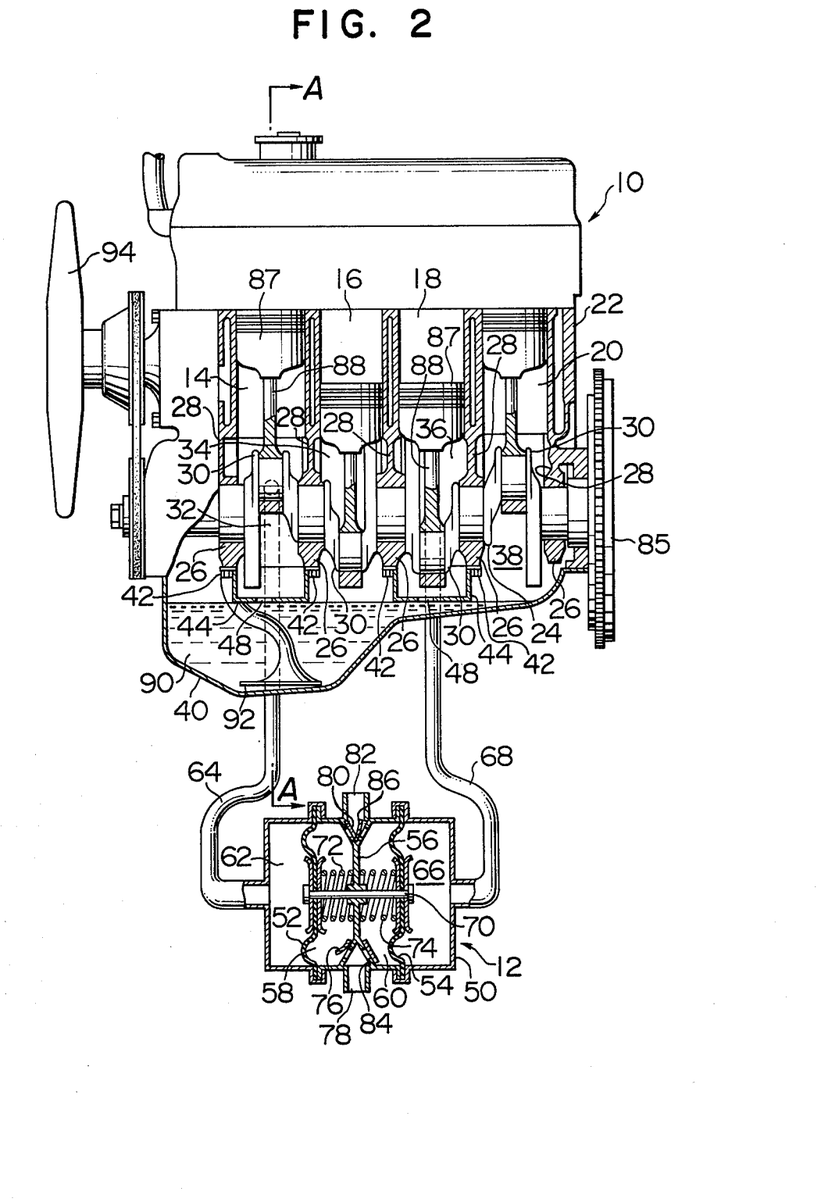
FIG. 2 is a longitudinal cross-section of a first embodiment of this invention.
Figure 3:
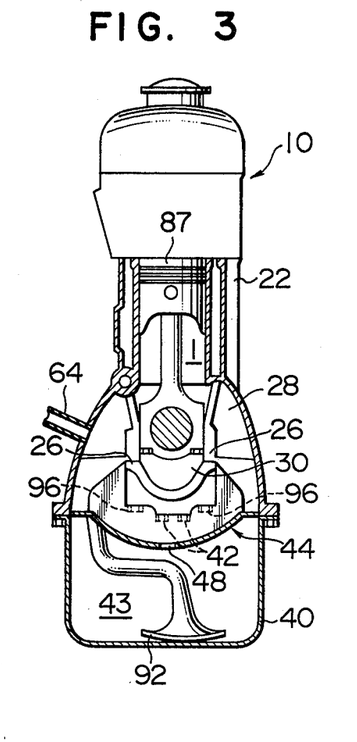
FIG. 3 is a cross-sectional view looking in the direction of the arrow A—A in FIG. 2.
Figure 4:
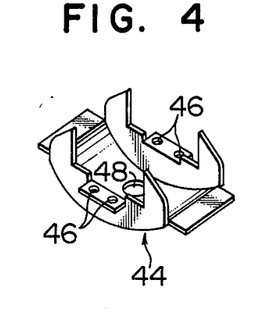
FIG. 4 is a perspective view of the partition plate in the first embodiment.

In a first embodiment of this invention shown in FIGS. 2 through 4, reference numeral 10 designates an automotive 4-cylinder engine proper, and 12 a diaphragm pump to supply secondary air for exhaust purification to an exhaust system not shown.

The lower portion of a cylinder block 22, in which cylinders 14, 16, 18 and 20 of the engine proper 10 are formed, is formed into a plurality of substantially parallel division walls 28 to provide bearings 26 to support a crankshaft 24. In individual spaces between the division walls 28 are formed crank chambers 32, 34, 36 and 38, each containing a set of cranks 30 fixed to the crankshaft 24. The crank chambers 32, 34, 36 and are 38 communicate with the cylinders 14 to 20 at the top, and open to an oil pan 40 at the bottom.

Partition plates 44 are fixed with bolts 42 to the lower ends of the division walls having adjacent bearings 26 on both sides of the cylinders 14 and 18, thereby separating the crank chambers 32 and 36 respectively communicating with the cylinders 14 and 18 from the remaining crank chambers 34, and 38 from the oil pan 40.

Each partition plate 44 has an oil drain hole 48 at the center of its curved bottom as well as holes 46 to pass the bolts 42.

The diaphragm pump 12 comprises a pair of diaphragms 52 and 54 which are disposed parallel to each other in a housing 50. A partition 56 is provided between the diaphragms 52 and 54 to form first and second pump chests or atmospheric air chambers 58 and 60. A pump pressure chamber 62 partitioned by the diaphragm 52 intercommunicates with the separated crank chamber 32 through an air passage 64, and a second pump pressure chamber 66 separated by the diaphragm 54 intercommunicates with the other separated crank chamber 36 through an air passage 68. Both ends of a rod 70, which slidably passes through the center of the partition 56, are connected to the centers of the diaphragms 52 and 54. The pump chests 58 and 60 respectively contain springs 72 and 74 to urge the diaphragms 52 and 54 from one of the pump chambers toward the other. The first pump chest 58 opens to the atmosphere at an intake port 78 through a reed valve 76 and communicates through a reed valve 80 with an delivery port 82 through which air is forced out. Said delivery port 82 further communicates, through a conduit not shown, either with a suitable place, such as thermal reactor or catalytic converter in the engine exhaust system, or with an exhaust passage located upstream of such exhaust purification equipment. The pump chest 60 communicates with said intake port 78 through a reed valve 84, and with said exhaust port 82 through a reed valve 86.

Item 85 is a flywheel connected to a clutch not shown, 87 are pistons fitted in the cylinders 14 through 20, 88 connecting rods to connect the pistons 87 to the cranks 30. 90 is lubricating oil in pan 40, 92 an oil strainer, 94 and a cooling fan, 96 (FIG. 3) are cap bolts to fasten the bearings 26.

Now the operation of the above-described air-pump system will be described hereunder.

As is well known, in an ordinary 4-cylinder engine, the pistons fitted in the cylinders 14 and 20 are fixed to the crank at the same angle, while the pistons in the cylinders 16 and 18 also are fixed at the same angle, with said two angles being displaced from each other by 180°. As the piston in the cylinder 14 descends, air in the crank chamber 32 is compressed to build up pressure, though part of the air escapes through the oil drain hole 48 or at gaps between the division wall 28 and the partition plate 44. Such air, at a built up or relatively high pressure flows through the air passage 64 into the pressure chamber 62 of the diaphragm pump 12. When the piston in the cylinder 14 descends, the piston in the cylinder 18 rises to permit expansion of air in the unseparated crank chamber 36, which lowers the pressure in it, though some air will flow into it from other crank chambers or from the oil pan 40 through the oil drain hole 48 etc. This low-pressure air passes through the air passage 68 into the pump pressure chamber 66.

Therefore, the crank chambers 32 and 36 each undergo a cycle of up-down pressure change as the engine rotates once. The pressure rise and drop occur in reversed timing in the two crank chambers, which reverses the pressure levels in the pressure chambers 62 and 66 for each rotation of the engine, thereby developing differential pressure to actuate the pump 12.

Figure 1:
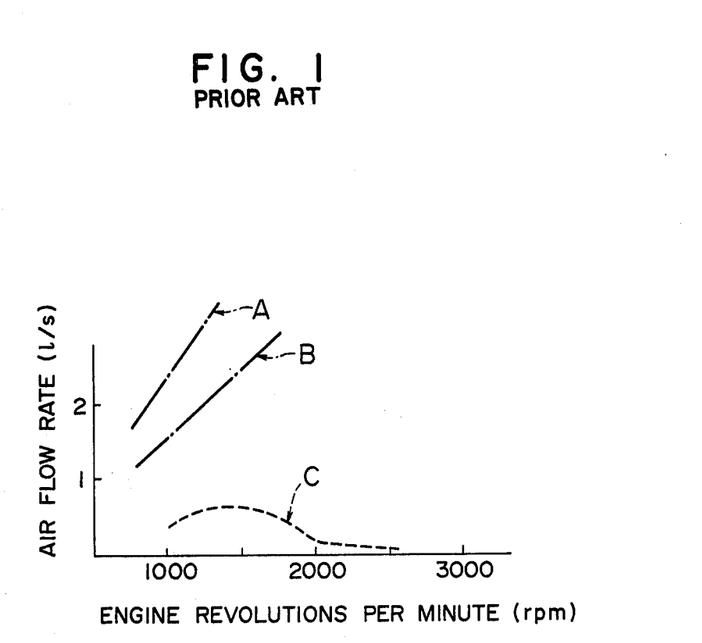
FIG. 1 is a diagram showing characteristics of air flow to the engine exhaust system given by the conventional-type pump.

When pressure is higher in the pressure chamber 62 than in the pressure chamber 66, the diaphragms 52 and 54 shift to the right in FIG. 1, against the urging force of the spring 72. Thereupon, atmospheric air in the pump chest 58 is compressed and discharged through the opened reed valve 80 and the delivery port 82. Meanwhile, the expanded pump chest 60 draws in atmosphere through the intake port 78 and the opened reed valve 84. In contrast, when pressure is lower in the pressure chamber 62 than in the pressure chamber 66, the diaphragms 52 and 54 shift to the left in FIG. 1, against the urging force of the spring 74. Then, the reed valve 76 opens to introduce atmosphere into the pump chest 58, while the reed valve 86 opens to discharge air from the pump chest 60 through the exhaust port 82.

The diaphragms 52 and 54 and the rod 70 have a specific natural (resonant) oscillation (or reciprocation) frequency that is established by the pushing force of the springs 72 and 74 and the connected masses. So the pump characteristic varies with a change in said pushing force etc. In this embodiment, the specific or resonant oscillating frequency is set below the medium rotation speed of the engine. Therefore, when the engine rotates at higher speed, the oscillating assembly comprising said rod 70 etc. cannot follow up the resulting air pressure variations. Then the pump 12 automatically becomes inoperative. This pump system exhibits such air-flow characteristics as shown in FIG. 5.

Figure 5:
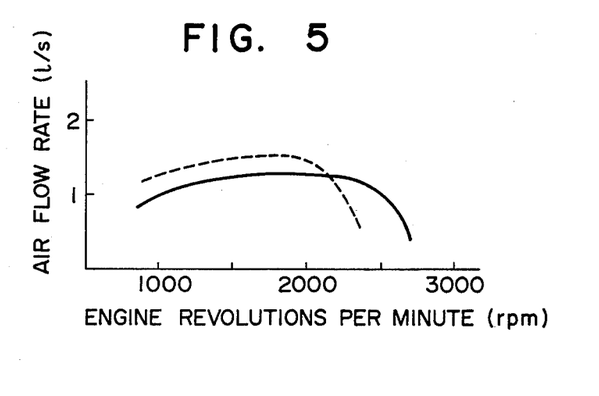
FIG. 5 is a schematic diagram of air-flow characteristics given by the first embodiment.

In FIG. 5, a solid line shows an air-flow curve obtained by the springs 72 and 74 with greater pushing force and a broken line indicates an air-flow characteristic by the springs 72 and 74 with smaller pushing force. By thus changing the pushing force of the springs 72 and 74, not only the air-flow rate itself but also the engine speed range in which it drops abruptly can be set as desired.

In the low engine-speed range where the exhaust temperature is too low to give good exhaust oxidation, exhaust purification efficiency can be improved by supplying a greater rate of secondary air into the exhaust gas. In the medium speed range where the exhaust temperature becomes relatively higher, good exhaust purification can be obtained even if secondary air rate is comparatively less. Rather, there is a tendency that excessive secondary air overcools the exhaust oxidation equipment etc. to lower purification efficiency in the high-speed range where the exhaust system is liable to be overheated, its reaction heat produced can be largely reduced by stopping the supply of secondary air.

In this respect, the above-described first embodiment of this invention, giving such air-flow characteristics as shown in FIG. 5, is suitable as a pump to supply secondary air to the exhaust system.

Figure 6:
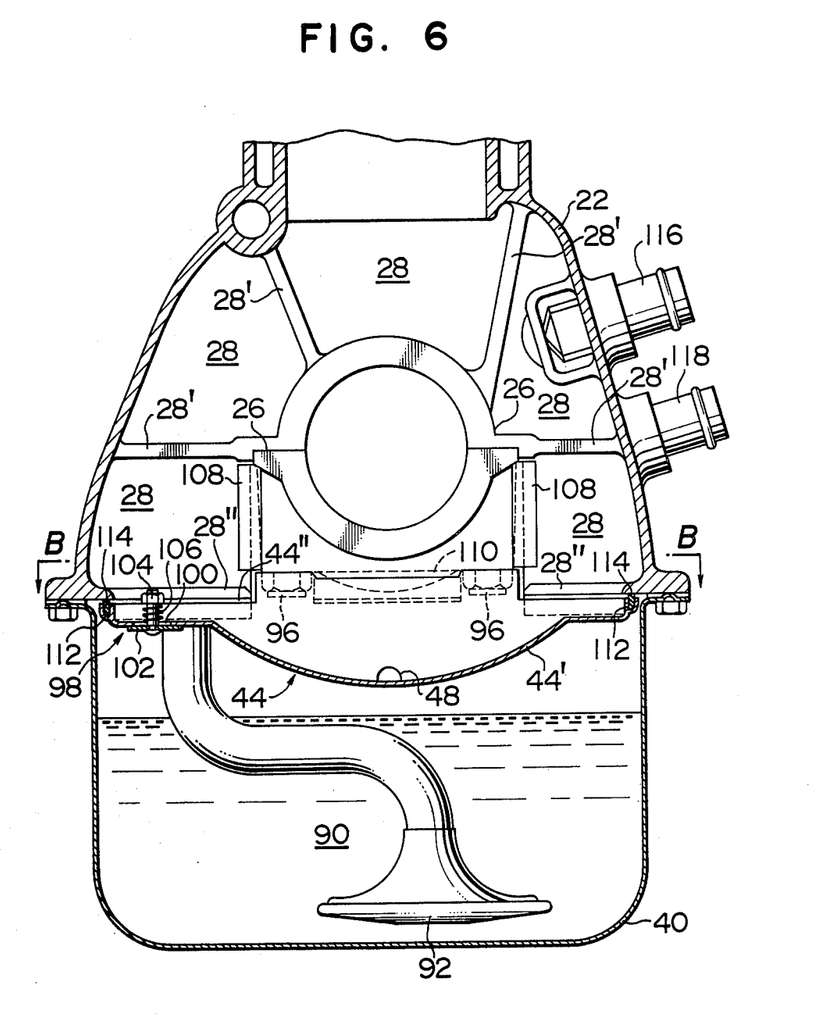
FIG. 6 is a cross-sectional view of a second embodiment of this invention.
Figure 7:
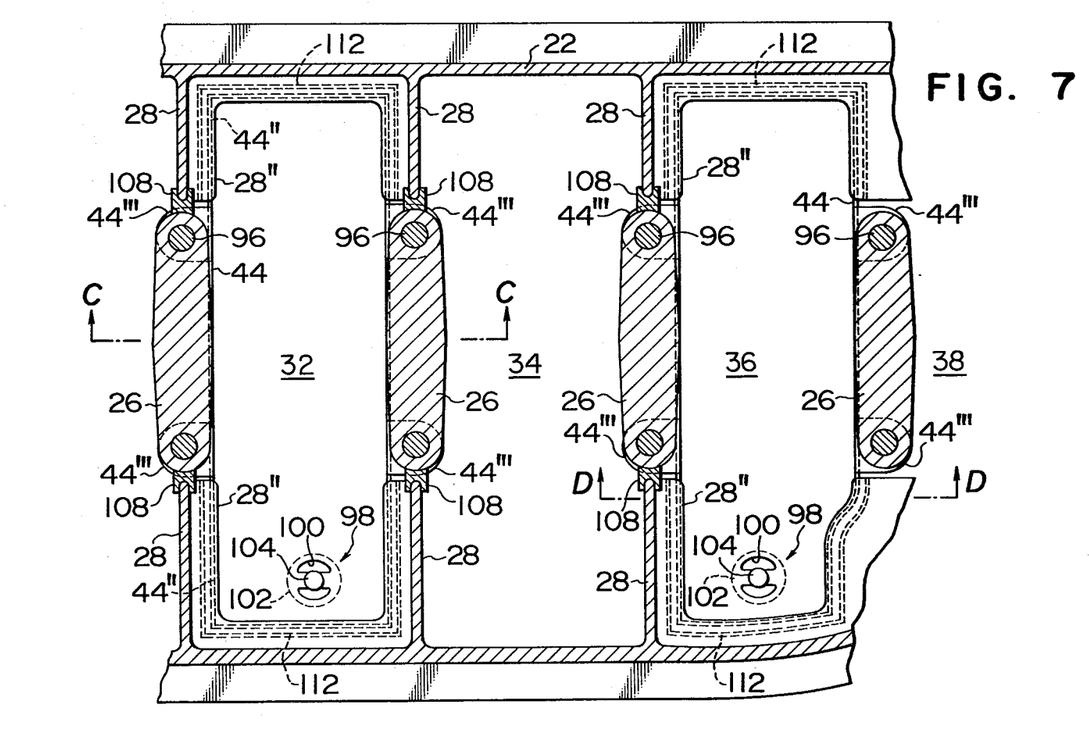
FIG. 7 is a cross-sectional view looking in the direction of the arrow B—B in FIG. 6.
Figure 8:
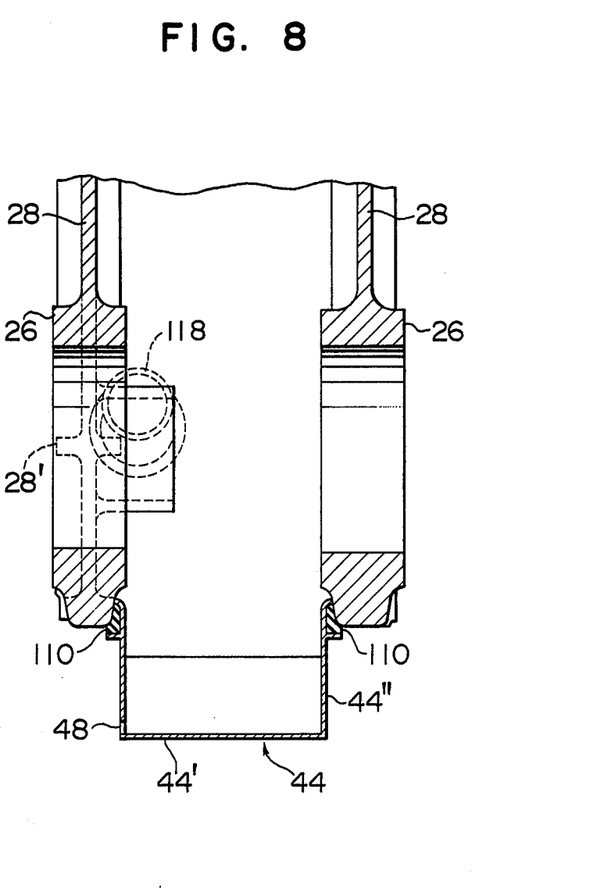
FIG. 8 is a cross-sectional view looking in the direction of the arrow C—C in FIG. 7.
Figure 9:
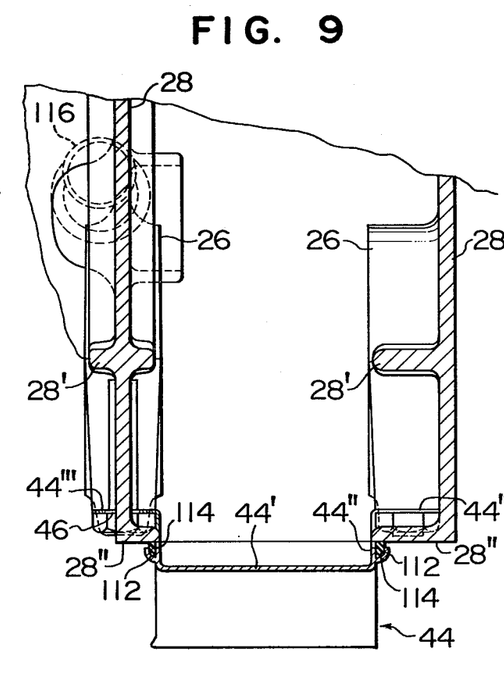
FIG. 9 is a similar cross-sectional view looking in the direction of the arrow D—D in FIG. 7.
Figure 10:
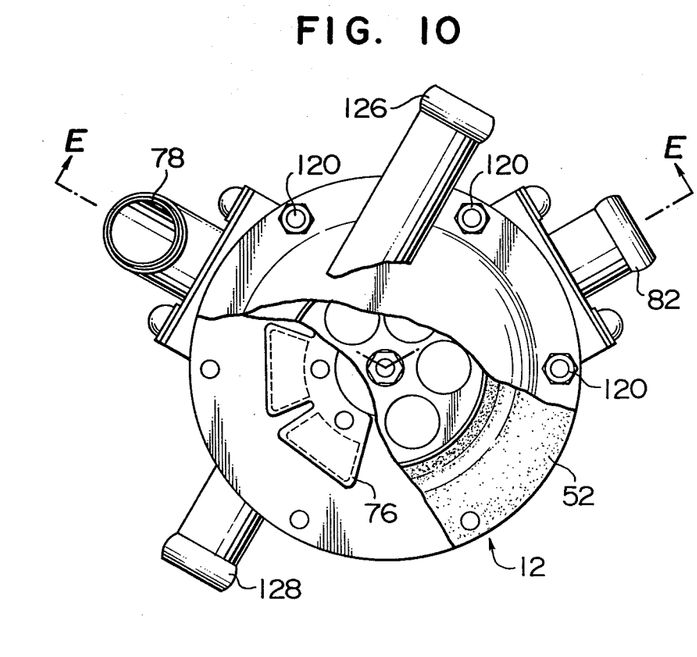
FIG. 10 is a top view of the diaphragm pump used in the second embodiment, with part thereof cut open.
Figure 11:
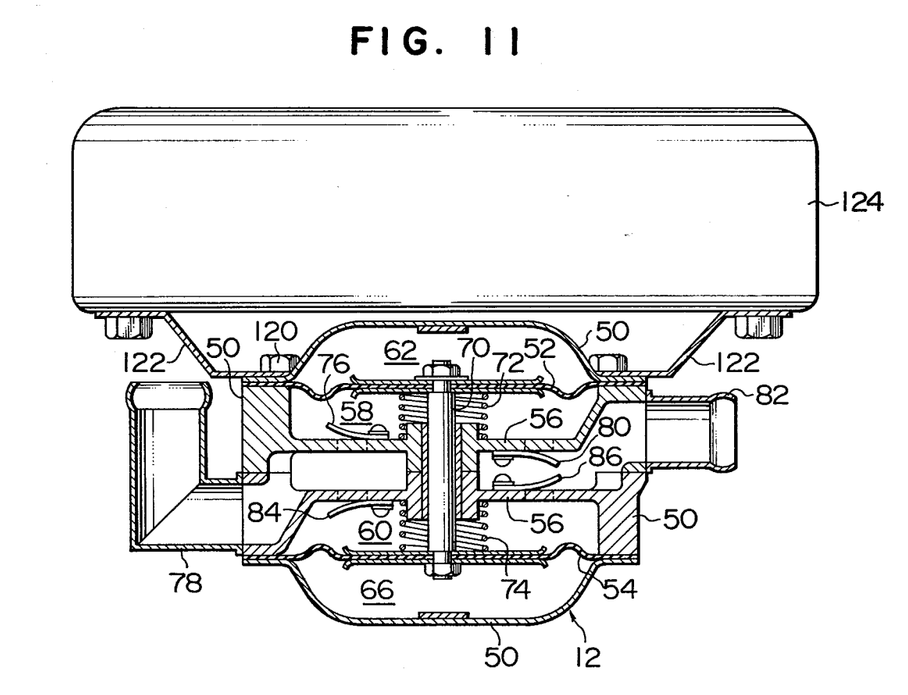
FIG. 11 is a cross-sectional view looking in the direction of the arrow E—E in FIG. 10.

Next, a second embodiment of this invention will be described by reference to FIGS. 6 through 11, using similar reference numerals for such parts as are similar or equivalent to those in the first embodiment. The division wall 28 in the cylinder block 22 is formed with a plurality of spaced ribs 28' and 28'', with the lower surface of the rib 28'' at the lowest end of the division wall 28 extending in a horizontal plane. A partition plate 44 consists of a bottom plate 44' and a surrounding side plate 44''. The side plate 44'' is perforated with an oil drain hole 48 in the lower middle portion of its longitudinal member, and it has bent projections 44''', each having a mating hole 46, at its upper end (FIG. 9). A relief check valve 98 is provided at one end of the curved bottom plate 44'(FIG. 8).

The relief check valve 98 consists of a valve disc 102 to open and close communicating holes 100 made in the curved bottom plate 44', a rod 104 passed through the center of said valve disc 102, and a spring 106 to urge the disc plate 102 loosely fitted on said rod 104 toward its closing position. When the difference in pressure between the crank chamber 32 or 36 and the oil pan 40 exceeds a predetermined value, the valve disc 102 moves to open the communicating holes 100 so that air in said crank chamber flows into the oil pan 40.

The partition plate 44, together with the bearings 26, is fixed with cap bolts 96 to the cylinder block 22 through said mating holes 46. A rubber seal 108 is provided to fill a gap between the bearing 26 and division wall 28. A rubber seal 110 (FIG. 8) is laid between the bearing 26 and the upper end of the side plate 44'' of the partition plate 44. An open-topped groove 112 is formed along the upper end of that portion of the side plate 44″ which corresponds to the rib 28″. The groove 112 is filled with a rubber seal 114, with the protruding portion of said seal 114 being flush against the rib 28″ to create a nonleaking union between said rib 28″ and the side plate 44″ (FIGS. 6, 9).

A varying air-pressure exhaust port 116 is provided in the external wall of the cylinder block 22 forming the crank chamber 32, and a varying air-pressure exhaust port 118 in the external wall forming the crank chamber 36. These chambers are shown in FIG. 7.

The diaphragm pump 12 (FIGS. 10, 11) is fixed to the bottom of a heat-riser 124 incorporated under the branching portion of the intake manifold by means of a bracket 122 to which the quadruple housing 50 is fastened with bolts 120. A varying air-pressure intake port 126 communicating with the pressure chamber 62 leads to said varying air-pressure exhaust port 116 by an air pipe not shown, also a varying air-pressure intake port 128 communicating with the pressure chamber 66 leads to said varying air-pressure exhaust port 118 through an air pipe not shown.

In this embodiment, airtightness of the crank chambers 32 and 36 is improved by the use of the rubber seals 108, 110 and 114, which permits air in these crank chambers to vary to a greater extent and thereby improves the pump efficiency.

The relief check valve 98 provided in this embodiment serves to limit the maximum level of varying air pressure that increases with raised engine speed below a certain level. Therefore, the air-flow characteristic can be controlled to a desired pattern by regulating the pushing force of the spring 106 in said check valve 98. This further prevents power loss due to abnormally high excursion of air pressure in said crank chambers.

Figure 12:
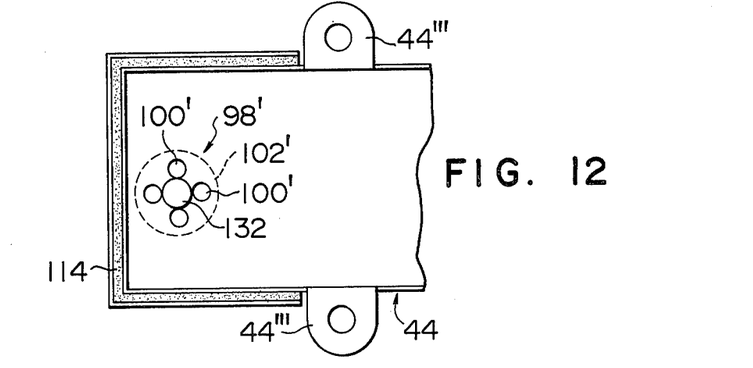
FIG. 12 is a plan view showing a modified form of the relief check valve used in the second embodiment.
Figure 13:
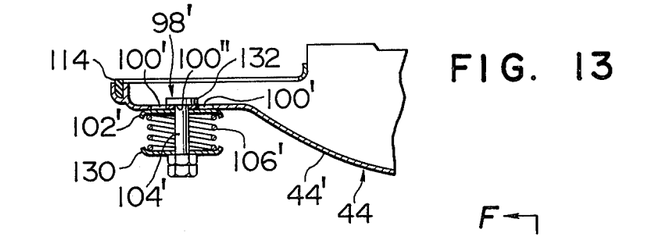
FIG. 13 is a longitudinal cross-section of the aforesaid modified relief check valve.

FIGS. 12 and 13 show a modified form of the relief check valve 98 used in the above-described second embodiment. This modified relief check valve 98′, provided at one end of the curved bottom plate 44′, comprises a rod 104′ slidably passed through a hole 100″ made in said curved bottom plate 44′. The rod 104′ carries a slidable valve disc 102′ to open and close a plurality of spaced holes 100′ made around said hole 100″ in the curved bottom plate 44′, and a spring-bearing plate 130 at its lower end. The top end of the rod 104′ is formed into a stopper 132 that contacts the upper surface of the curved bottom plate 44′. A spring 106′ is interposed between said valve disc 102′ and spring-bearing plate 130. By the expanding force of the spring 106′, the valve disc 102′ closes the holes 100′, coming in contact with the lower surface of the curved bottom plate 44′.

With this modified valve, when the air pressure in the crank chambers above the partition plate 44 exceeds a certain level, the valve disc 102′ is pushed downward against the force of the spring 107′. This opens the holes 100′ and releases the air in said crank chambers into the oil pan, thereby preventing excessive rising of air pressure in the crank chambers 32 and 36.

Figure 14:
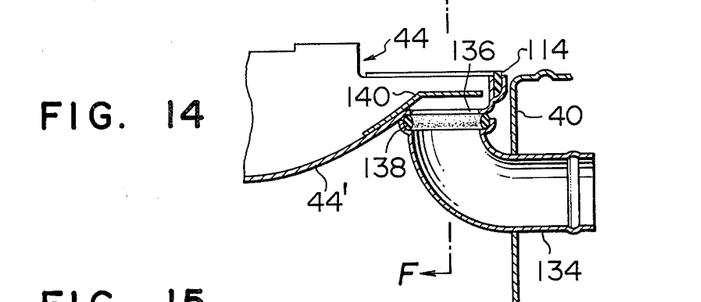
FIG. 14 is a cross-sectional view showing a modified form of the varying air-pressure exhaust port in the second embodiment.
Figure 15:
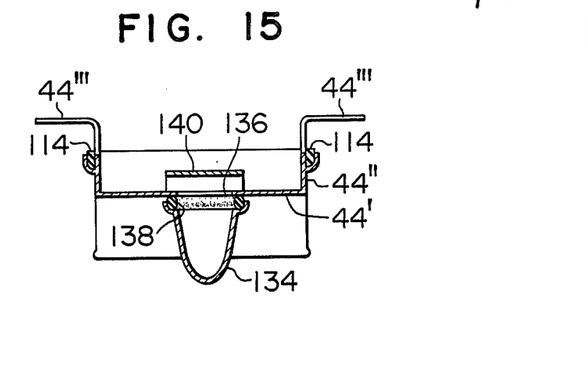
FIG. 15 is a cross-sectional view looking in the direction of the arrow F—F in FIG. 14.

FIGS. 14 and 15 show a modified form of the varying air-pressure outtake ports 116 and 118 in the above-described second embodiment. In this modification, a varying air-pressure outtake pipe 134 passing through the side wall of the oil pan 40 is fixed thereto by welding. A round hole 136 is made at one end of the curved bottom plate 44′ connected with the partition plate 44. In fitting the oil pan 40, the inside end of said outtake pipe 134 comes in contact with the lower surface of the curved bottom plate 44′ around said round hole 136, with a rubber seal ring 138 therebetween. The varying air-pressure in the crank chamber is delivered through the round hole 136 and outtake pipe 134 into the pressure chamber 62 or 66 of the diaphragm pump 12.

Reference numeral 140 designates an oil shield fixed to the upper surface of the curved bottom plate 44′ so as to extend over said round hole 136. This oil shield 140 prevents the oil collected on the partition plate 44 from entering the exhaust pipe 134.

In the above-described first and second embodiments, air-pressure variations in both crank chambers 32 and 36 are utilized. But the pump can be operated by air-pressure variations in, for instance, the crank chamber 32 only. If the pump 12 is to be used in this case, the pressure chamber 66 can be opened to the atmosphere after eliminating the air passage 60 connected thereto.

Figure 16:
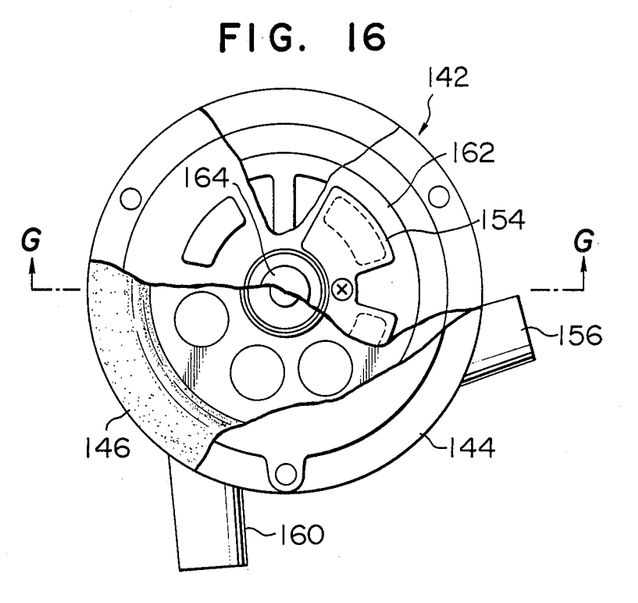
FIG. 16 is a top view showing a modified form of the diaphragm pump, with part thereof cut open.
Figure 17:
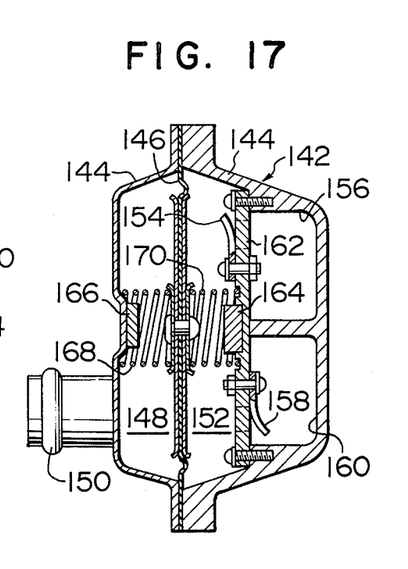
FIG. 17 is a cross-sectional view looking in the direction of the arrow G—G in FIG. 16.

Referring now to FIGS. 16 and 17, a modified form of the diaphragm pump that is operated by the air-pressure variations in a single crank chamber will be described. This diaphragm pump 142 has one diaphragm 146 disposed in a bisected housing 144. Of two chambers separated by said diaphragm 146, one is a pressure chamber 148 having a varying air-pressure intake port 150, and the other is a pump chamber 152 leading to an intake port 156 through a reed valve 154 and to an exhaust port 160 through a reed valve 158. A partition plate 162, which separates the pump chamber 152 from the intake and delivery ports 156 and 160, carries the reed valves 154 and 158. At its center, there is provided a stopper 164 to restrict the motion of the diaphragm 146 to the right in FIG. 17. Another stopper 166 to restrict the motion of the diaphragm 146 to the left in FIG. 17 is provided on the inside wall of the housing 144 facing the center of the diaphragm 146. In the chamber 148, a spring 168 is inserted between the inside wall of the housing 144 and the diaphragm 146. In the chamber 152, similarly, a spring 170 is interposed between the partition plate 162 and the diaphragm 146.

When pressure in the pressure chamber 148 rises, the diaphragm 146 shifts to the right in FIG. 17, against the pushing force of the spring 170. Then, air in the pump chamber 152 is compressed, opens the reed valve 158, and is discharged through the delivery port 160. When pressure in the pressure chamber 148 becomes negative, the diaphragm 146 is drawn to the left in FIG. 17, against the pushing force of the spring 168. Then, air in the pump chamber 152 expands to develop a vacuum in it, which opens the reed valve 154 and introduces additional air through the intake port 156 into the pump chamber 152. By repeating this alternate cycle, air is continuously supplied to the exhaust system of the engine.

The pump of this invention is in no way limited to the diaphragm pump 12 or 142 shown in the above-described embodiments. But the same effect can be attained by replacing the diaphragms with piston or other member which works in response to differential pressure.

Figure 18:
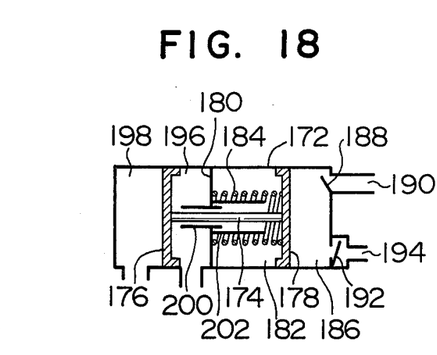
FIG. 18 is a cross-sectional view of another modified pump.

Now a piston-type pump will be described by reference to FIG. 18. Two pistons 176 and 178, connected by a rod 174, are fitted in a housing 172. A partition 180 through which the rod 174 passes is disposed between the two pistons. A spring 184 to urge the piston 178 to the right in FIG. 18 is provided in a chamber 182 defined between the partition 180 and piston 178. A pump chest 186 on the right of the piston 178 has an intake port 190, opening through a reed valve 188, and an delivery port 194 through a reed valve 192. A pressure chamber 196 between the piston 176 and partition 180 communicates with the crank chamber 36 by the air passage 68. A pressure chamber 198 on the left of the piston 176 communicates with the crank chamber 32 by the air passage 64.

Items 200 and 202 are stoppers to restrict the shifting extent of the pistons 176 and 178.

In this modified embodiment, the piston 176 reciprocates in response to variations in pressure introduced into the pressure chambers 196 and 198. By the pumping action of the piston 178 interlocked therewith, air sucked through the intake port 190 into the pump chamber 186 is supplied through the delivery port 194 into the exhaust system of the engine.

As will be understood from the above, the air-pump system for reciprocating engines of this invention utilizes pressure variations in the engine's crank chambers as power source to drive the pump. As aforementioned, the pump automatically becomes inoperative as the engine enters such speed range as requires no air supply from it. This invention can thus offer an inexpensive pump system particularly effective for exhaust purification, dispensing with air volume control valves.

What is claimed is:

1. A multicylinder engine, partition and air pump system, comprising:
   a cylinder block having therein a plurality of cylinders each with a piston reciprocable therein, the block also having a plurality of division walls extending from the cylinders to provide crank chambers each communicating with one of the cylinders, the walls having bearings therein for a crankshaft to be rotated by the pistons, and the block having an oil pan at a bottom thereof;
   a partition plate for at least one of the crank chambers in the cylinder block, the plate being secured to lower portions of the division walls of the respective chamber to separate that chamber from the other crank chambers and from the oil pan; and
   an air pump having a variable-pressure chamber communicating with the separate crank chamber, also having an air-pressure chamber which has an inlet communicating with the atmosphere, an outlet for supplying atmospheric air to condition an exhaust of the cylinders, and controls for the inlet and outlet, the air pump having a pump member responsive to differentials of pressure between said pressure chambers, and spring means for urging the pump member to move from one of the pressure chambers toward the other, the spring means having an oscillation frequency natural thereto whereby it is resonant with a predetermined and relatively low frequency at which the pistons reciprocate in the cylinders and supply air at variable pressure through the separate crank chamber to the variable-pressure chamber of the air pump, to render the air pump ineffective when the pistons reciprocate at a relatively high frequency, subject to renewed operation of the air pump with the pump member moving resonant to the relatively low frequency when the pistons again reciprocate at said relatively low frequency.

2. A system according to claim 1 wherein the pump member is a diaphragm.

3. A multicylinder engine, partition and air pump system, comprising;
   a cylinder block having therein a plurality of cylinders each with a piston reciprocable therein, the block also having a plurality of division walls extending from the cylinders to provide crank chambers each communicating with one of the cylinders, the walls having bearings therein for a crankshaft to be rotated by the pistons, and the block having an oil pan at a bottom thereof;
   a partition plate for at least one of the crank chambers in the cylinder block, the plate being secured to lower portions of the division walls of the respective chamber to generally separate that chamber from the other crank chambers and from the oil pan, the plate however having a hole for establishing communication between the respective cylinder and the oil pan to permit draining of oil from the cylinder and its crank chamber to the oil pan, thereby also controlling variable air pressures established in the respective crank chamber by the respective piston; and
   an air pump having a variable-pressure chamber communicating with the separate crank chamber, also having an air-pressure chamber which has an inlet communicating with the atomosphere, an outlet for supplying atmospheric air to condition an exhaust of the cylinders, and controls for the inlet and outlet, the air pump having a pump member responsive to differentials of pressure resulting from application of the controlled variable air pressures to one of the pressure chambers, and of pressures of atmospheric air to other pressure chamber, and spring means in the air pump for urging the pump member to move from one of the pressure chambers toward the other, the spring means having an oscillation frequency natural thereto whereby it is resonant with a predetermined and relatively low frequency at which the pistons reciprocate in the cylinders and supply air at variable pressure through the separate crank chamber to the variable-pressure chamber of the air pump, to inactivate the air pump when the pistons reciprocate at a relatively high frequency, subject to reactivation of the air pump with the pump member moving resonant to the relatively low frequency when the pistons again reciprocate at said relatively low frequency.

4. A system according to claim 3, also including means for adjusting the hole in the partition plate to adjust the controlled variable pressure.

5. A multicylinder engine, partition and air pump system, comprising;
   a cylinder block having therein a plurality of cylinders each with a piston reciprocable therein, the block also having a plurality of mutually parallel division walls depending from the cylinders to provide a plurality of crank chambers each communicating with one of the cylinders, the walls having bearings therein for a crankshaft to be rotated by the pistons, and the block having an oil pan at a bottom thereof;
   a partition plate for at least one of the crank chambers in the cylinder block, the plate being secured to lower portions of the division walls of the respective chamber to separate that chamber from the other crank chambers and from the oil pan;
   a relief check valve in the partition plate, said valve having elastic means for permitting opening of the valve when variable air pressures, established in the respective crank chamber by the respective piston, exceed a predetermined pressure, and for thereby limiting the variable air pressures; and an air pump having a variable-pressure chamber communicating with the separate crank chamber, also having an air-pressure chamber which has an inlet communicating with the atmosphere, an outlet for supplying atmospheric air to condition an exhaust of the cylinders, and controls for the inlet and outlet, the air pump having a pump member responsive to differentials of pressure resulting from application of the limited variable air pressures to one of the pressure chambers, and of pressures of atmospheric air to the other pressure chamber, and spring means for urging the pump member to move from one of the pressure chambers toward the other, the spring means having an oscillation frequency natural thereto whereby it is resonant with a predetermined and relatively low frequency at which the pistons reciprocate in the cylinders and supply air at variable pressure through the separate crankshaft chamber to the variable-pressure chamber of the air pump, to inactivate the air pump when the pistons slide at a relatively high frequency, subject to renewed operation of the air pump with the pump member moving resonant to the relatively low frequency when the pistons again reciprocate at said relatively low frequency.

* * * * *